(12) United States Patent
Ferreira Moreno et al.

(10) Patent No.: US 11,222,051 B2
(45) Date of Patent: Jan. 11, 2022

(54) DOCUMENT ANALOGUES THROUGH ONTOLOGY MATCHING

(71) Applicant: International Business Machines Corporation, Armonk, NY (US)

(72) Inventors: Marcio Ferreira Moreno, Copacabana (BR); Viviane Torres da Silva, Laranjeiras (BR); Daniel Salles Civitarese, Rio de Janeiro (BR); Rafael Rossi de Mello Brandao, Botafogo (BR); Renato Fontoura de Gusmao Cerqueira, Barra da Tijuca (BR)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 16/365,815

(22) Filed: Mar. 27, 2019

(65) Prior Publication Data

US 2020/0311111 A1    Oct. 1, 2020

(51) Int. Cl.
*G06F 16/332* (2019.01)
*G06F 16/36* (2019.01)
*G06F 40/30* (2020.01)

(52) U.S. Cl.
CPC ........ *G06F 16/3329* (2019.01); *G06F 16/367* (2019.01); *G06F 40/30* (2020.01)

(58) Field of Classification Search
CPC .... G06F 16/3329; G06F 40/30; G06F 16/367; G06F 16/335
USPC .............................................................. 704/9
See application file for complete search history.

(56) References Cited

U.S. PATENT DOCUMENTS

| | | | |
|---|---|---|---|
| 6,675,159 B1 * | 1/2004 | Lin | G06F 40/253 |
| 9,430,563 B2 | 8/2016 | Clinchant et al. | |
| 10,025,783 B2 | 7/2018 | Agrawal et al. | |
| 2015/0310128 A1 | 10/2015 | Brav et al. | |
| 2016/0275196 A1 * | 9/2016 | Lee | G06F 16/24522 |
| 2018/0150459 A1 | 5/2018 | Farid et al. | |

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

*Primary Examiner* — Thierry L Pham
(74) *Attorney, Agent, or Firm* — Scully, Scott, Murphy & Presser, P.C.; Joseph Petrokaitis

(57) ABSTRACT

A document may be received. An ontology associated with a domain may be identified or retrieved. A set of concepts in the document may be extracted, the set represented in the ontology. A set of concepts selected from the ontology may be received. A search may be performed based on the set of selected concepts.

20 Claims, 9 Drawing Sheets

US 11,222,051 B2

DOCUMENT ANALOGUES THROUGH ONTOLOGY MATCHING

BACKGROUND

The present application relates generally to computers and computer applications, and more particularly to search engines, databases, and ontologies.

Search engines usually retrieve documents based on input such as a keyword or a combination of keywords. For instance, a search engine searches for documents and files indexed in searchable repositories that contain one or more of the keywords requested in a search query.

BRIEF SUMMARY

A method, in one aspect, may include receiving a document. The method may also include retrieving an ontology associated with a domain. The method may further include extracting a set of concepts in the document, the set represented in the ontology. The method may also include receiving a set of selected concepts selected from the ontology. The method may further include performing a search based on the set of selected concepts selected from the ontology.

A system comprising, in one aspect, may include at least one hardware processor coupled with a memory device. The at least one hardware processor may be operable to receive a document. The at least one hardware processor may be further operable to retrieve an ontology associated with a domain. The at least one hardware processor may be further operable to extract a set of concepts in the document, the set of concepts represented in the ontology. The at least one hardware processor may be further operable to receive a set of selected concepts selected from the ontology. The at least one hardware processor may be further operable to perform a search based on the set of selected concepts.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and technique are disclosed, which allows for finding a document that is an analog of a document being consumed (also referred to as an original document). In one embodiment, an analog to a given document is identified in terms of a given ontology. For instance, a search for an analog document or analog documents can be performed based on concept or concepts found in the given document and based on a knowledge graph that specifies the analogy. This graph may be defined or selected, for example, by a user, and it is called analog graph.

In one embodiment, a search engine in the present disclosure retrieves one or more documents that mentions or defines a selected concept or concepts. The search engine may also retrieve one or more documents that mentions or defines any concept related to a selected concept according to the relationships present in the analog graph.

In one embodiment, an analog graph can be a sub-graph of a knowledge graph that represents domain knowledge (e.g., knowledge about a domain, topic or subject area). A domain specific knowledge graph can be used to model concepts, instances of concepts and relationships among concepts that define parts of a domain. In one embodiment, a knowledge graph is a directed graph including vertices that represent the concepts or instances, and arcs (edges or connections) that represent the relationships among them.

Figure 1:
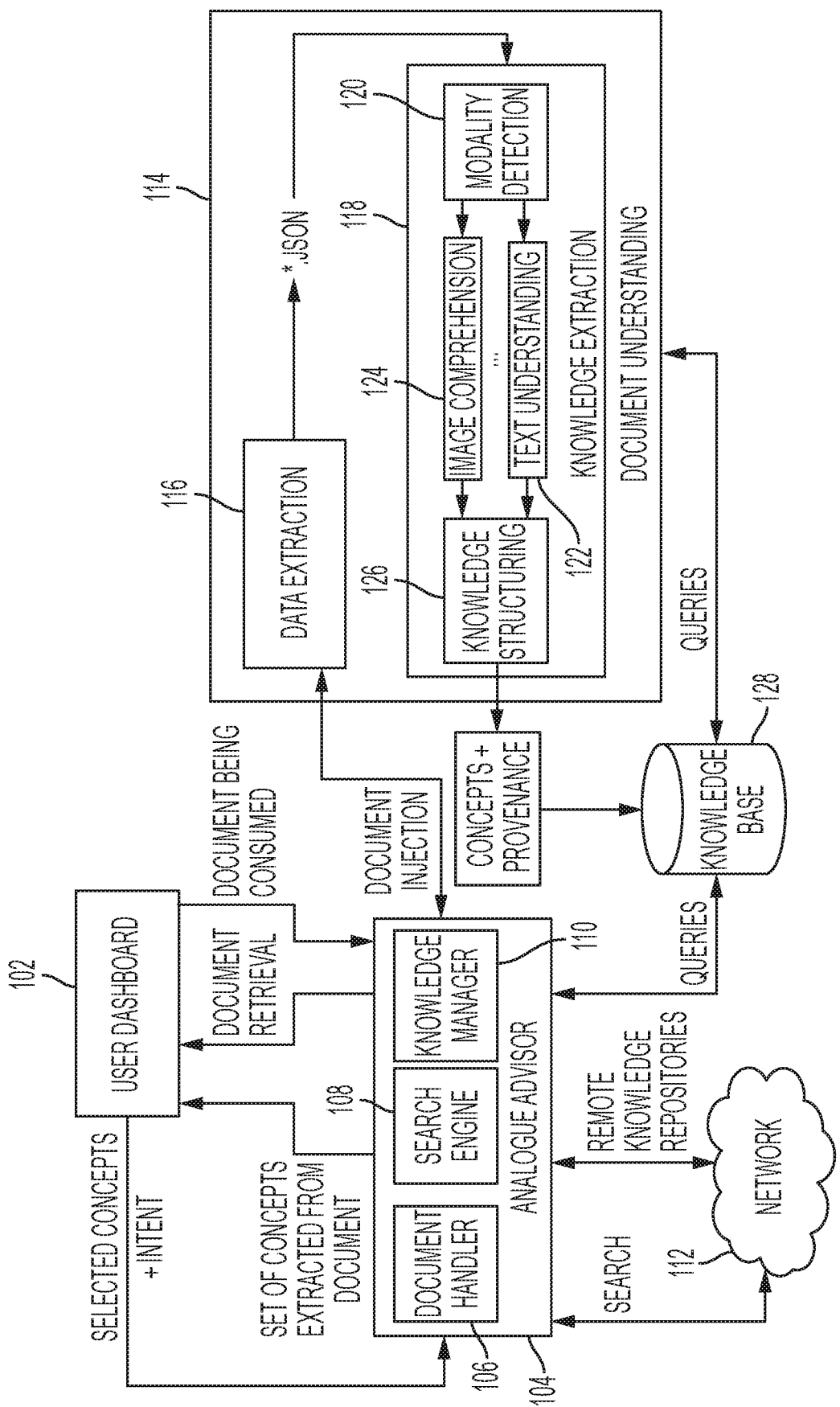
FIG. 1 is a diagram illustrating system architecture in one embodiment.

FIG. 1 is a diagram illustrating system architecture in one embodiment. System architecture can include logical subsystems or components, for example, document understanding pipeline, analog query engine, search engine, document injection, document parser, document structurer, analogue advisor, user dashboard, and a knowledge base. In one aspect, the components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A user dashboard component 102 or functionality (also referred to as dashboard) provides an interface to users, and can be a user interface such as a browser or another user interface (UI). A graphical user interface (GUI) is an example of a UI. Selected concept and ontology or a part of ontology (e.g., structured as a graph) can be presented to a user via a dashboard 102. Dashboard 102 allows a user to input a set of concepts and hierarchy level in a given ontology, which for example, is of interest to the user. For instance, in one embodiment, a user interface can be provided so a user may select a level in the hierarchy or select specific concepts, along with a document of interest, to define a scope of analogy.

An analog subsystem 104 in one embodiment handles aspects such as parsing the document structure (through the Document Handler 106 subcomponent), retrieving documents (Search Engine 108) and matching concepts and terms present in these searchable documents (using the Knowledge Manager 110 subcomponent). For example, a document handler component 106 or functionality (also referred to as a document handler) may parse a document and identify structural elements in the document. A search engine 108 or search functionality may search for and retrieve one or more documents, for instance, from a network 112 of computer systems storing documents. A knowledge manager subcomponent 110 or functionality (also referred to as a knowledge manager) may match one or more concepts and terms present in searchable documents.

A document understanding 114 pipeline parses a received document to understand concepts in the document. In one embodiment, a document understanding pipeline 114 can include data extraction 116 and knowledge extraction 118. In one embodiment, data extraction 116 includes receiving documents of different types from a document injection mechanism (e.g., an action of inputting a document in the pipeline). Data extraction 116 may process received documents to obtain their content, such as texts, images and metadata information. This information is structured, for instance, into a data structure, for processing.

Knowledge extraction or a knowledge extraction logical subsystem or functionality 118 extracts and structures knowledge, processing the obtained data. In one embodiment, knowledge extraction subsystem processing may include modality detection. For instance, a modality detection module or functionality 120 identifies the data type to be processed, e.g., identifies whether the data type to be processed is image, text, audio, video, or another data type. Each data may be then delivered to its respective processor. For instance, text data is sent to and handled by a text understanding module or functionality 122, and image data is delivered to an image comprehension module or functionality 124. In one embodiment, text understanding 122 parses plain text, processing obtained metadata to extract relevant entities and relations. Concepts are considered as entities of an ontology (e.g., classes and/or instances). In one embodiment, image comprehension 124 extracts domain context and concepts from images. These processor modules or functionalities 122, 124 can make queries on a knowledge base 128 to enhance their performance such as disambiguating a given textual term.

In one embodiment, a knowledge structuring module or functionality 126 may combine information produced by the text understanding at 122 and image comprehension at 124 to highlight concepts and their provenance. In one embodiment, to highlight concepts and their provenance, a knowledge structuring module 126 considers one or more ontologies specified by a knowledge manager 110. For instance, knowledge structuring 126 creates a data structure that includes concepts and relations associated with a given document.

In one embodiment, structured information is stored in a knowledge base 128, which has a mechanism to explore concepts and content by querying data from documents processed by the pipeline. In one aspect, knowledge base 128 can also combine different remote knowledge repositories to retrieve further relevant information. The knowledge base can be a storage service capable of storing the structured knowledge representation (knowledge graph). The knowledge base can also a query mechanism such that the user can specify, for instance, a query capable of retrieving a graph or graphs. Services to provide visualization of the graphs may use this query functionality.

The following illustrates an example use case in one embodiment for finding a document analog, for example, finding an analogous document to a given document. In one embodiment, a document analog is identified based on one or more concepts in a given ontology.

A document is received. A user may provide the document to be used as the basis for finding analog documents, for instance, the user may input a document via dashboard 102. A system of the present disclosure provides a list of concepts found in the document. For instance, document understanding pipeline 114 analyzes the document and produces a list of concepts as described above.

In one embodiment, the system may provide an ontology graph containing the list of concepts. The user, for example, via dashboard 102, may select one or more concepts from the list. The user may also select a graph of concepts, for example, concepts related to a selected concept. In one aspect, the selected graph of concepts is referred to as an analog graph. The system searches for document analogs considering one or more of the selected concepts and the analog graph. For instance, search engine 108 searches computer network 112 for one or more documents that mention or define selected concept and other related concepts as defined in the analog graph. The knowledge manager component 220 can be in charge of querying the knowledge base 128, which may contain all the structure extracted from the documents, returning a proper information to the dashboard.

Figure 2:
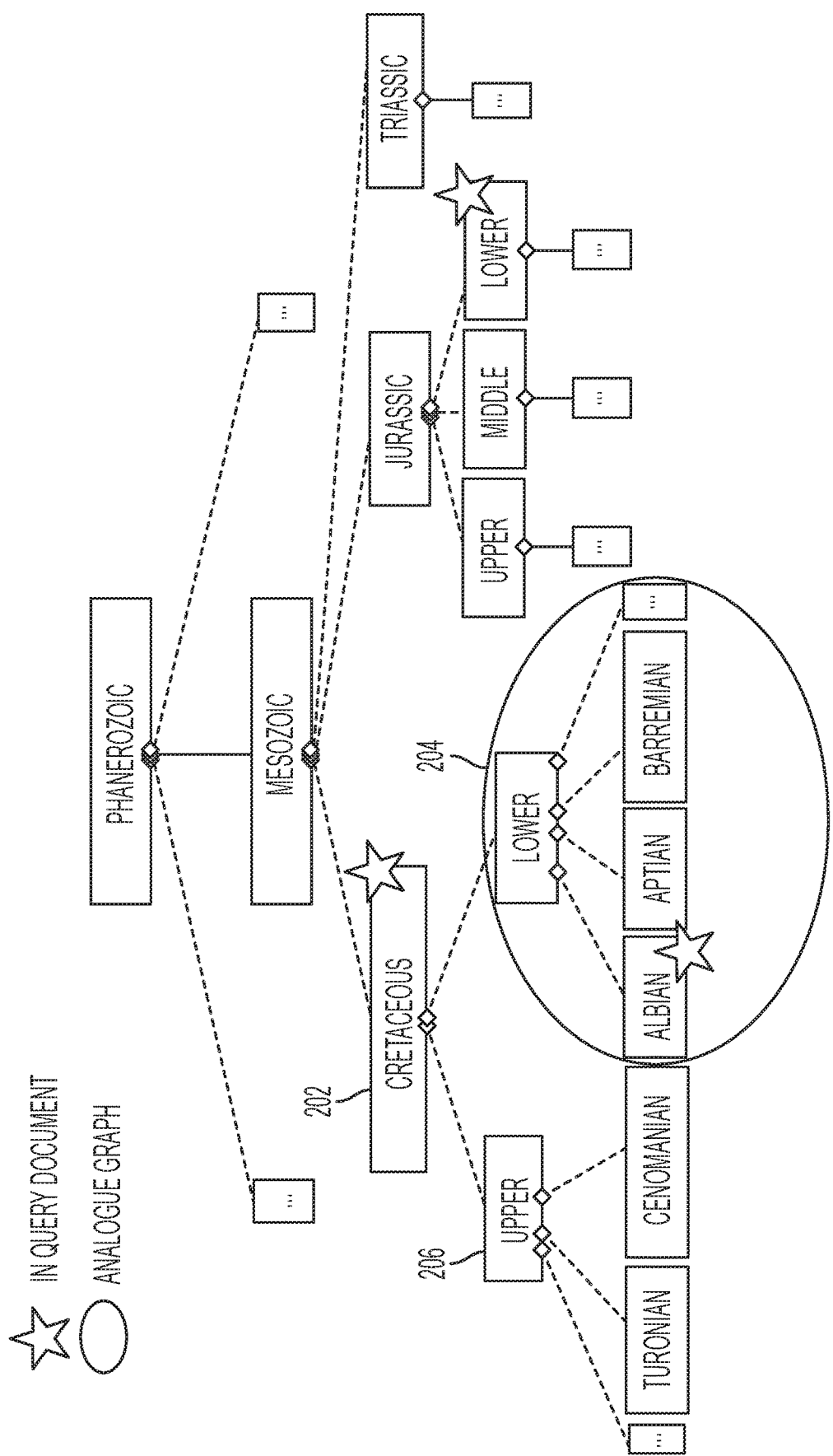
FIG. 2 shows example ontology and analog graph in one embodiment.

The following illustrates an example of searching for an analogous document or document analog in one embodiment. FIG. 2 shows in one embodiment, as an example, a geological unit ontology that defines the eon, eras, periods, epochs, ages and their relationships. In such ontology, the Mesozoic Era is composed by Cretaceous, Jurassic and Triassic Periods. The Cretaceous Period is composed by the Lower and Upper Cretaceous Epochs. The Lower Cretaceous Epoch is composed by Albian, Aptian, Barremian, Hauterivian, Valanginian, Berriasian Ages and the Upper Cretaceous Epoch by Maastrichtian, Campanian, Santonian, Coniacian, Turonian and Cenomanian Ages.

Consider that an input or original document mentions the Cretaceous Period 202. The system in one embodiment provides to the user a dashboard representing all the epochs and ages of the Cretaceous Period. The user can define an analog graph 204 by selecting the concepts or the relationships that is to be considered in the search. In this example, the user selects the whole Lower Cretaceous Epoch hierarchy (i.e., all its ages are selected) 204 and the Upper Cretaceous Epoch (without including its ages) 206. Search engine (e.g., FIG. 1, 108) searches for documents that mention the following concepts: Lower Cretaceous, Albian, Aptian, Barremian, Hauterivian, Valanginian, Berriasian and Upper Cretaceous.

Figure 3:
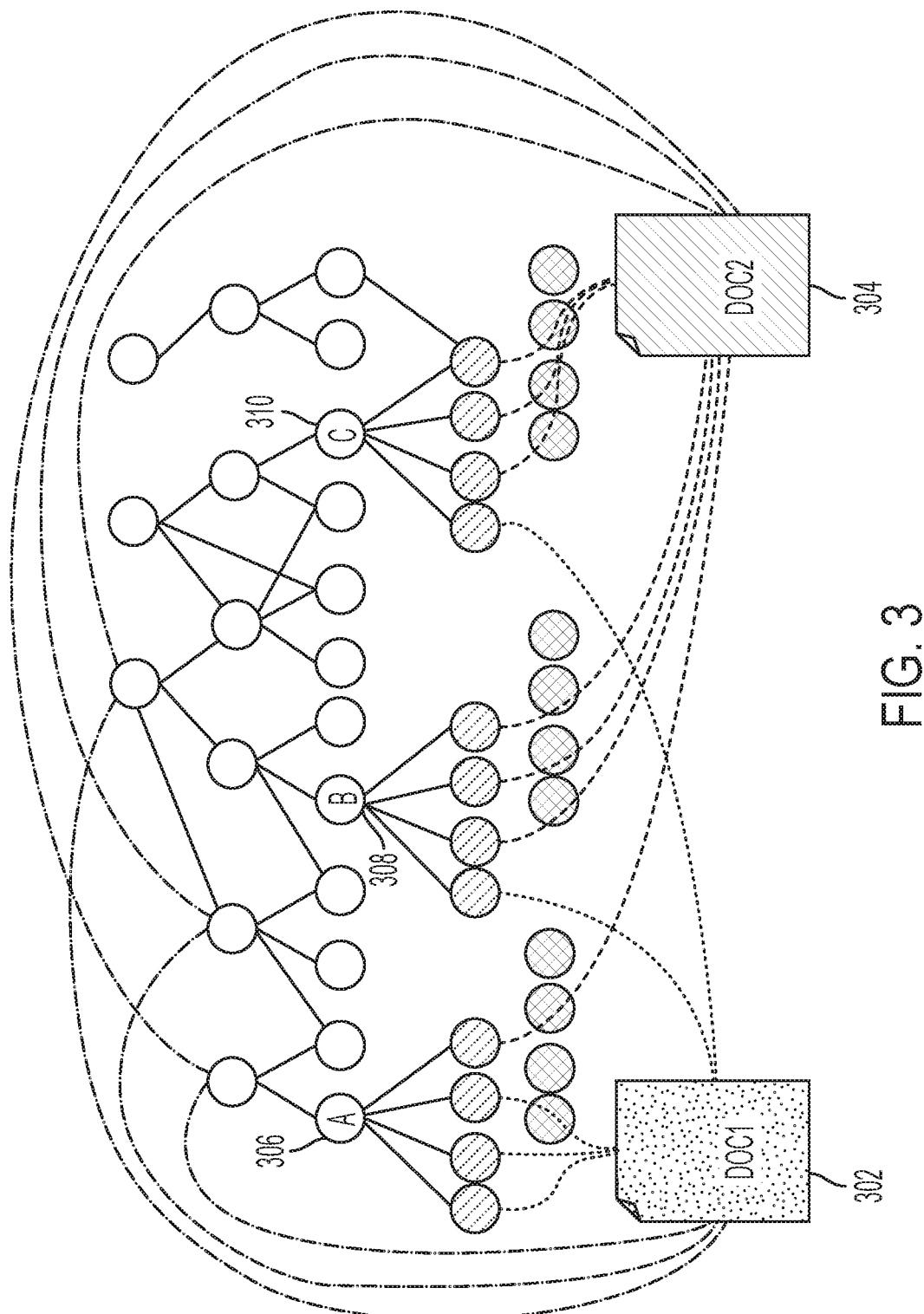
FIG. 3 shows an example of ontology hierarchy and document concept matching in one embodiment.

FIG. 3 shows an example of ontology hierarchy and document concept matching in one embodiment. A document is considered to be an analogue to another document if there is a similarity in the hierarchy of concepts extracted from these documents. In one embodiment, this extraction is performed according to one or multiple ontologies. For example, document 302 is an analog of document 304 because both are discussing concepts related to A 306, B 308, and C 310.

When defining the ontology of a domain, domain experts and ontology experts can work together. Domain experts have the knowledge about the domain and ontology experts have the knowledge about ontology creations. The domain expert can explain the domain and provide documentations that include definitions about the main elements that characterize the domain. Based on such definitions, the ontology expert can define the concepts, instances and relationships that will compose the domain ontology.

To keep the tracking of the reasons for including each element on the ontology, the ontology should be linked to provenance data that identifies the documents where the definition of each element could be found. Such documents can be used for the ontology maintenance, since the decisions for including an element in the ontology is supported by the documents, and also for the end users, for example, to provide a more detailed explanation about each element to explain the relevance and representativeness of the ontology in such a domain. The system of the present disclosure in one embodiment can search for documentations that support the definition of the elements represented in such ontologies, for example, for provenance data. The system of the present disclosure in one embodiment can search for a document that may corroborate or refute the way an element is defined in an ontology. In one aspect, the system of the present disclosure may search for a documentation associated with an element in ontology, where that element may be missing a relevant documentation that may be used to define that element. For instance, the World Wide Web may be searched for documents that define such elements. The search engine in one embodiment allows for finding a definition or definitions for a given element.

After finding a document that defines an element of ontology, the system in one embodiment may indicate if such document corroborates for defining the element according to the ontology or if such document refutes such definitions. In one aspect, to find out if a document corroborates with the definition of an element found in the ontology, the system may explore one or more of the concepts and relationships defined in the ontology itself.

In order to exemplify the literature definition search engine, consider an ontology that defines rocks lithology and the minerals that compose them. Halite is sometimes defined as a lithology but sometimes it is defined as a mineral that compose a rock. The user may want to define the analogy in terms of a mineral or in terms of lithology where both possibilities are represented in the ontology.

In one embodiment, a system and method allow a user to find one or more documents that are analogs of a given document through document understanding and ontology matching to improve search accuracy. One or more concepts can be extracted from an input query or input document and ontology can be identified based on the extract concept or concepts. The ontology may be returned, for example, with extracted concept or concepts identified in the ontology, for presenting to the user. The user is allowed to select one or more concepts in the ontology, for example, defining an analog graph, for performing a search based on user selected concepts to automatically retrieve documents related to the query document.

In one aspect, a method and system may include finding document analogs and/or literature definition through document understanding and ontology matching. A query document may be received. A set of concepts from the query document may be extracted. An ontology may be identified based on the extracted concepts. The ontology and the extracted concepts may be returned, for presenting to the user. For instance, the ontology with the extracted concepts identified in the ontology may be presented to a user. A selection of one or more items in the ontology may be received. For instance, a user may select one or more items in the ontology. A search can be performed based on the selected items to identify one or more documents related to the query document.

In one aspect, a system and/or method may allow for understanding semantics of searchable documents to improve search accuracy and retrieve more relevant results. Being able to identify and match concepts, synonyms and word variations of a same term, leverages traditional search processes and makes it possible to enhance the overall user experience. A method and system in one embodiment may allow users to search for specific a topic discussed in documents and files in the searchable space. For instance, a user may be searching for one or more similar technical documents such as papers, reports, or others, which are aligned with the current document the user is consuming, which may be missing a concept of interest.

In one aspect, a system and/or method in one embodiment may find an analog document through document understanding and ontology matching. The system and/or method may automatically retrieve a document that is an analog to a specific document. The system and/or method may automatically retrieve a document that is an analog to a specific document according to a selection of concepts that are a part of an ontology. The system and/or method may allow a selection of a different hierarchical level in a knowledge graph to define a document analog search and retrieval. The system and/or method may automatically retrieve a set of documents that can define one or more concepts present in an ontology or a terminology.

Figure 4:
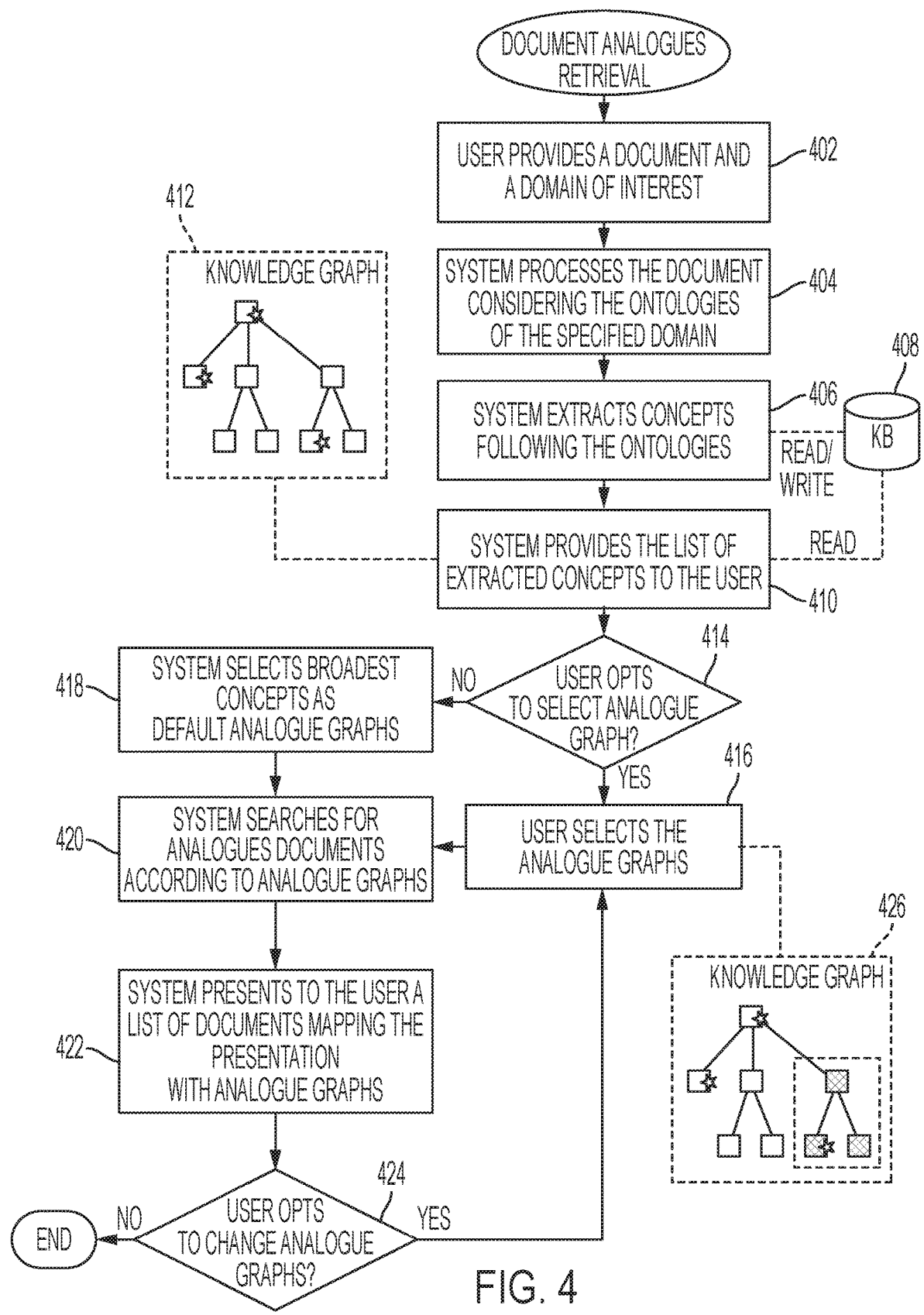
FIG. 4 is a flow diagram illustrating a use case example in one embodiment.

FIG. 4 is a flow diagram illustrating a use case example in one embodiment. At 402, a user provides a document and domain of interest. At 404, a system processes the document considering one or more ontologies of the specified domain. This process may include processes of the data extraction 116 and knowledge extraction 118. The ontology can guide the text understanding and the image comprehension to determine what to extract and how to structure these extractions in the knowledge structuring 126. For instance, the ontology can aid in disambiguation in natural language processing. At 406, the system extracts one or more concepts according to one or more ontologies, for example, using a knowledge base 408.

At 410, the system retrieves from the knowledge base 408, a list of concepts identified in the document and in one or more ontologies of the domain, and provides a list of extracted concepts. For example, as shown at 412, an ontology or a part of ontology with identified concept annotated on the ontology may be presented.

At 414, the user is presented with an option to select an analog graph, for example, a set of connected concepts from the ontology. At 416, for example, user selects an analog graph and user selected analog graph may be received. For instance, a user may be allowed to select a portion of the ontology as an analog graph, for example, shown at 426.

At 418, for example, is the user does not select or provide a selection, the system may automatically select a default analog graph. For example, the broadest concepts may be selected as a default. For instance, a higher level in the hierarchy of the ontology implies broader concepts, since it is considering all the children concepts in the hierarchy.

At 420, the system searches for analog documents or document analogs according to analog graph. For instance, search is performed for a document or documents that contain one or more concepts having relationships as specified in the analog graph.

At 422, the system may return a list of documents from the search. In one aspect, the list of documents may be mapped to corresponding concepts in the ontology. A mapping of the documents to the ontology may be presented to the user, for example, via a dashboard.

At 424, the user may be allowed to select a different or another analog graph. If the user selects another different analog graph, the logic continues at 416.

Figure 5:
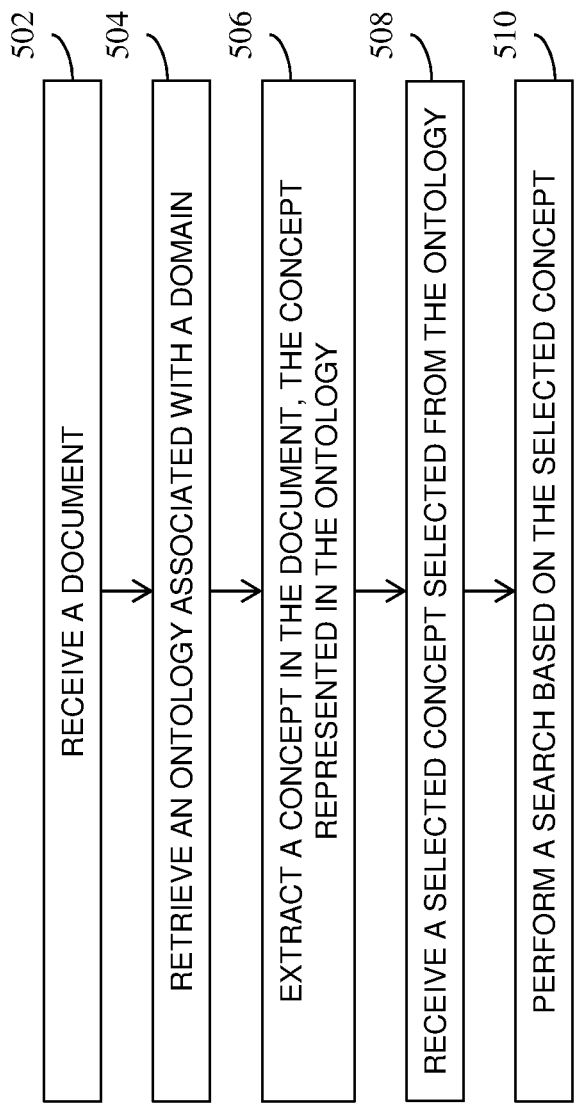
FIG. 5 is a diagram illustrating a method in one embodiment.

FIG. 5 is a diagram illustrating a method in one embodiment. At 502, a document may be received. In one aspect, a document and domain of interest may be received. For instance, such information may be input by a user. In another aspect, a domain may be automatically inferred based on the document's content. A domain, for instance, refers to a topic or subject area.

At 504, ontology associated with a domain is retrieved. For example, an ontology structure associated with a domain, such as an ontology graph is retrieved from a database.

At 506, a concept (also referred to as a document concept) or a set of concepts is extracted from the document. One or more concepts may be extracted. For instance, the document may be parsed and analyzed, and a concept in the document that is also represented in the ontology may be extracted.

The concept and the ontology are communicated or returned, for example, for presentation to a user. For instance, a part or portion of the ontology graph containing the concept may be returned. For instance, an ontology graph containing the concept's parent level, sibling level, and children levels may be returned. In another aspect, an ontology graph comprising nodes of the domain may be returned. The levels of ontology graph surrounding the concept, to be returned can be configurable. The ontology or sub-graph is presented to the user with the extracted concept identified on the ontology graph. The user is enabled to select a concept (represented as a node) of the ontology graph. The user is also enabled to select a portion or sub-graph of the ontology graph. For instance, a group of nodes and their connections may be selected.

At 508, a selected concept selected from the ontology graph is received. In one aspect, a selected sub-graph selected from the ontology graph may be received. In one aspect, if a sub-graph selection is not received, a sub-graph is automatically determined based on the selected concept. For instance, the selected concept's children nodes and/or a parent node and/or a sibling node in the ontology graph may be selected automatically.

At 510, a search is performed based on the selected concept. If a sub-graph is selected, the search may be performed based on concepts specified by the nodes of the sub-graph of the ontology. A document resulting from the search is returned. One or more documents may be returned.

Figure 6:
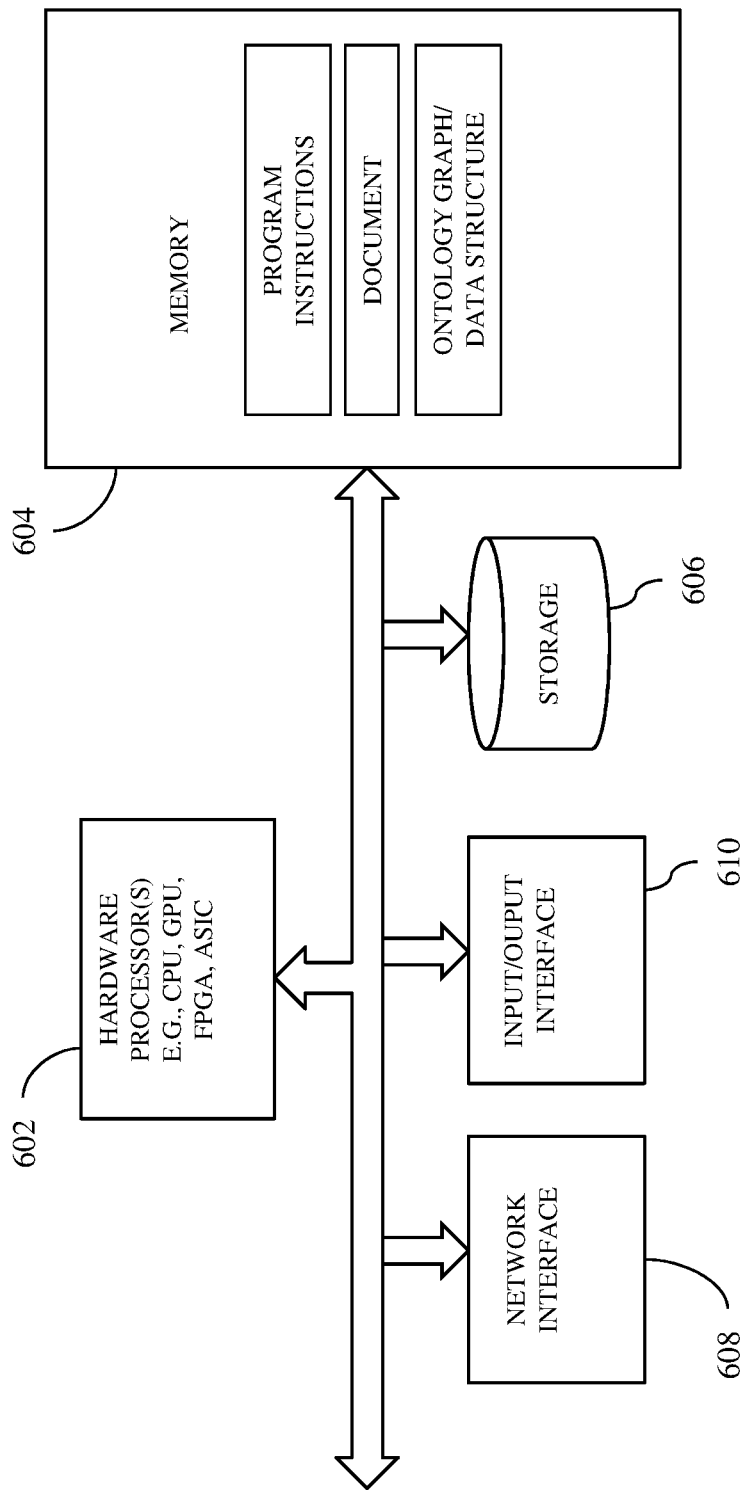
FIG. 6 is a diagram showing components of a system in one embodiment that finds a document analog.

FIG. 6 is a diagram showing components of a system in one embodiment that finds a document analog, for example, through document understanding and ontology matching. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and find a document analog. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. At least one hardware processors 602 may receive input comprising a document. At least one hardware processors 602 may retrieve an ontology associated with a domain. At least one hardware processors 602 may extract a concept in the document, the concept represented in the ontology. At least one hardware processors 602 may receive a selected concept selected from the ontology. At least one hardware processors 602 may perform a search based on the selected concept and at least a sub-graph of the ontology. In one aspect, data such as a received document and/or ontology graph may be stored on a storage device 606 or received via a network interface 608 from a remote device, and may be temporarily loaded into a memory device 604. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
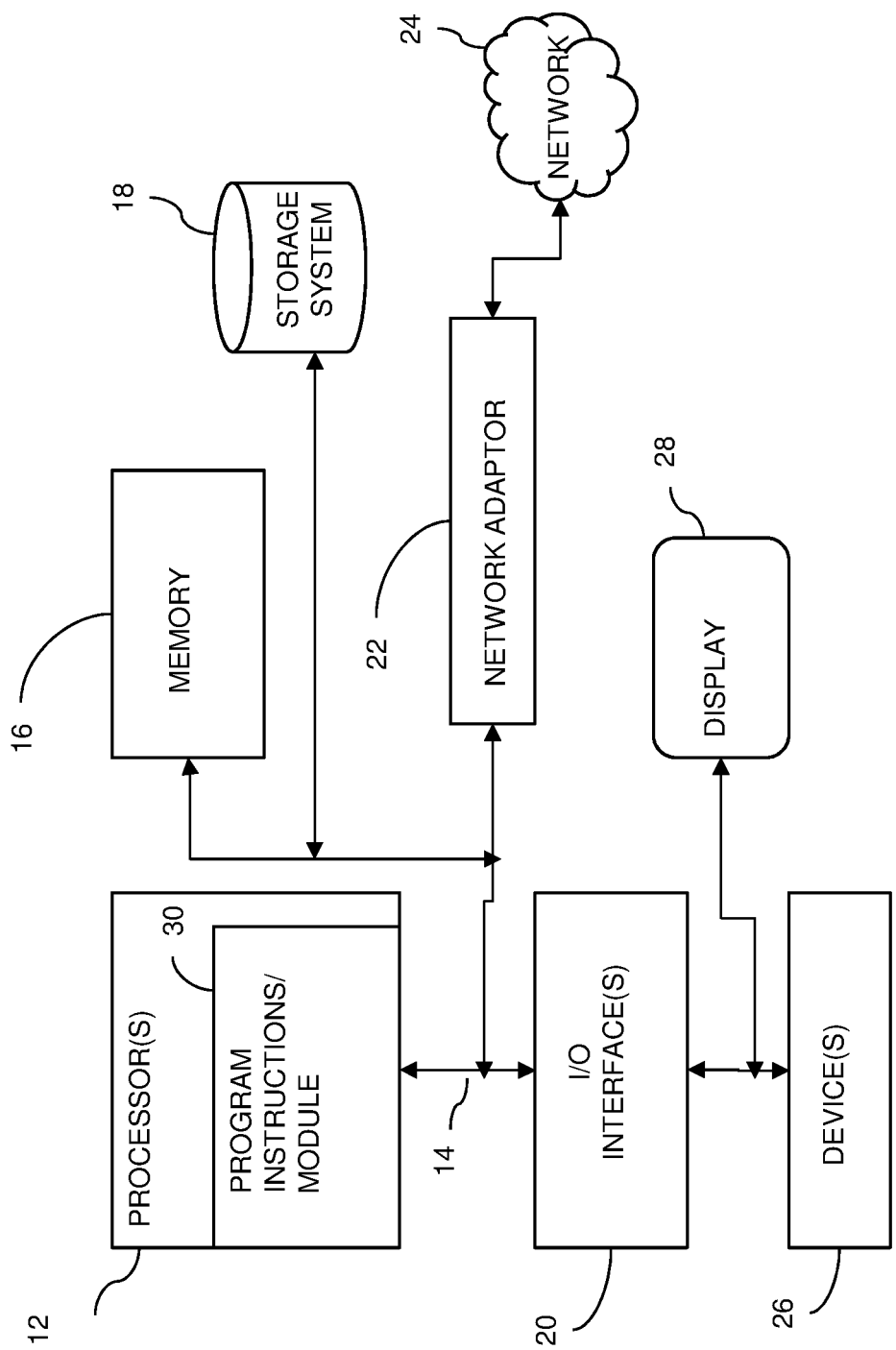
FIG. 7 illustrates a schematic of an example computer or processing system that may implement a system according to one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
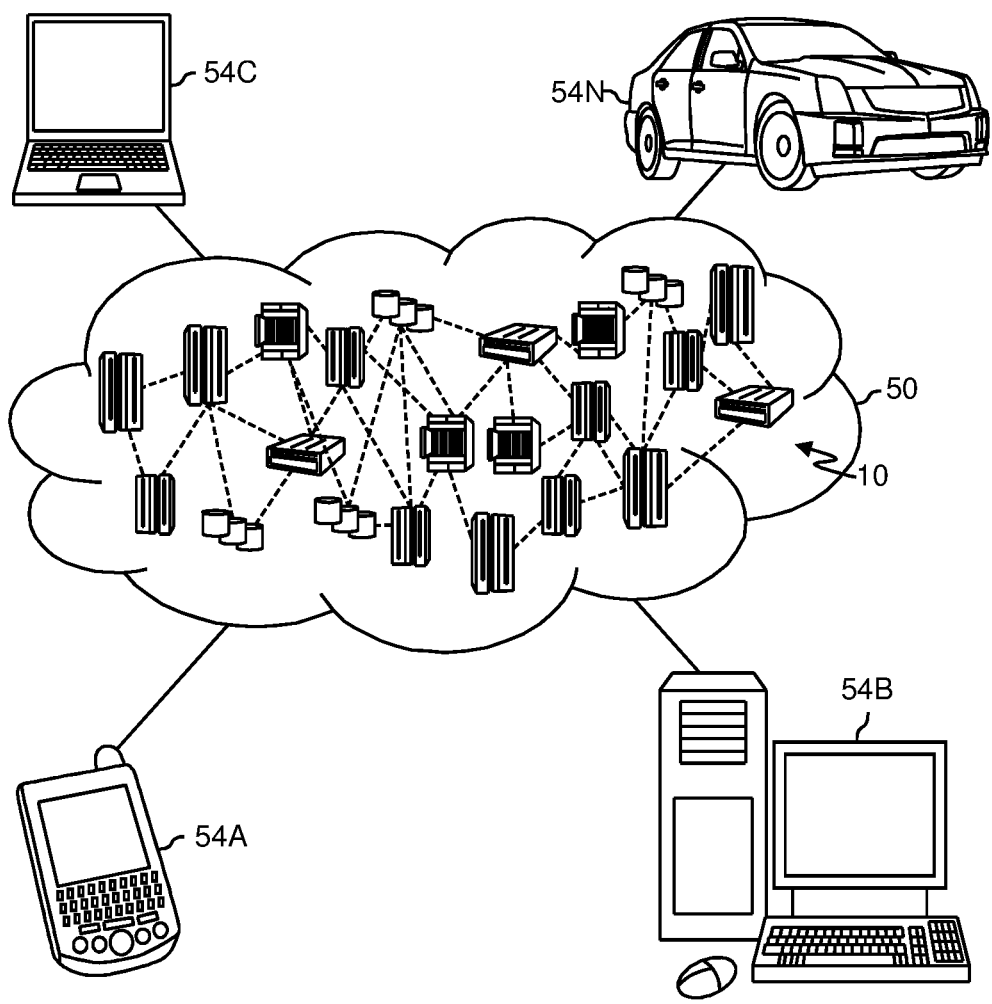
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
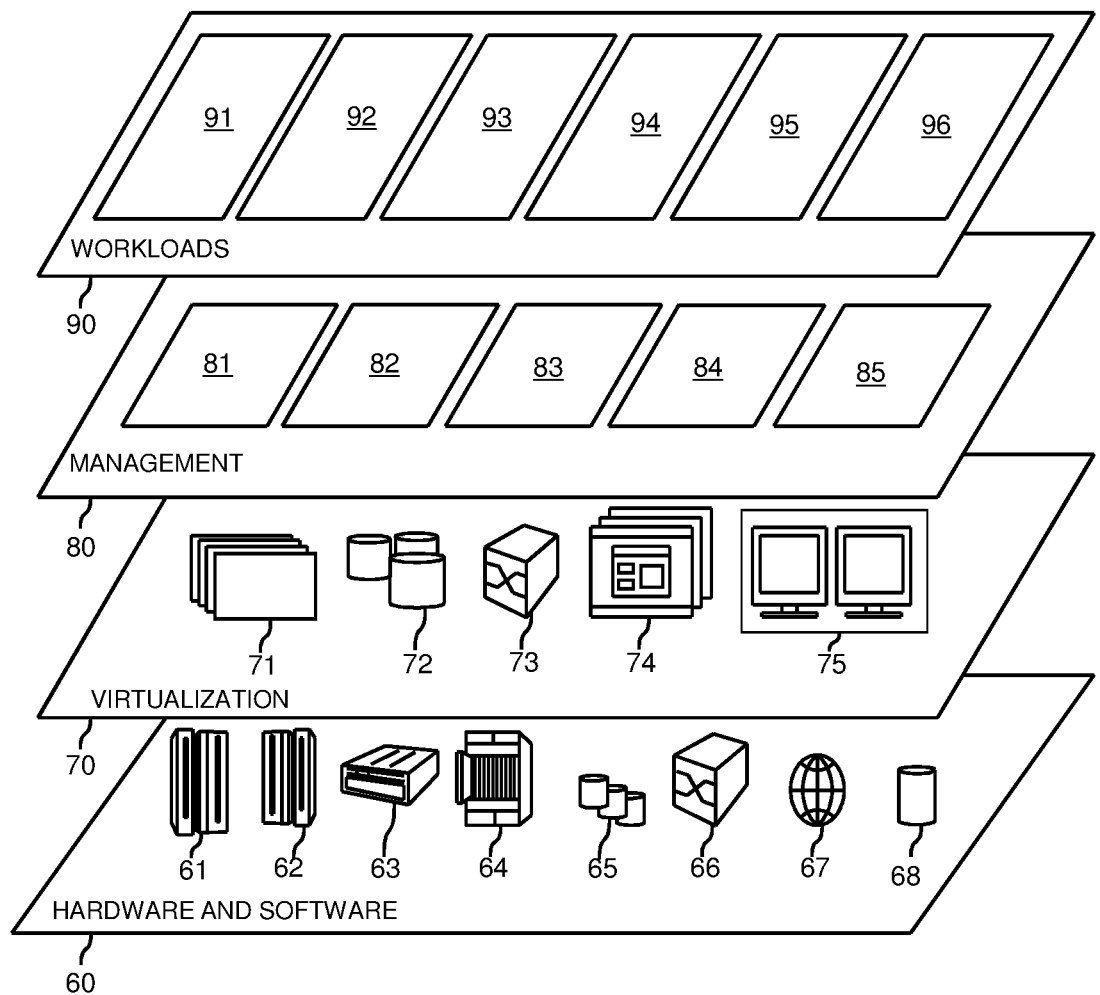
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document analog processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a document;
   retrieving an ontology associated with a domain;
   extracting a set of concepts in the document, the set of concepts represented in the ontology;
   causing presenting of an ontology graph comprising the set of concepts and connected concepts, which are connected to the set of concepts according to the ontology associated with the domain, and allowing a user to select a subgraph from the ontology graph;
   receiving a set of selected concepts selected from the ontology, the set of selected concepts represented by the subgraph, wherein subgraph includes a hierarchy level in the ontology graph; and
   performing a search based on the set of selected concepts selected from the ontology.

2. The method of claim 1, further comprising returning a document resulting from the search.

3. The method of claim 1, further comprising returning a document resulting from the search, the document mapped to the ontology.

4. The method of claim 1, wherein the set of selected concepts is a sub-graph of the ontology selected by a user.

5. The method of claim 1, wherein a sub-graph is automatically identified based on the extracted set of concepts.

6. The method of claim 1, wherein the extracted set of concepts and a graph representing the ontology are returned for presentation on a graphical user interface.

7. The method of claim 1, wherein the domain is received.

8. A system comprising:
   at least one hardware processor coupled with a memory device;
   the at least one hardware processor operable to at least:
   receive a document;
   retrieve an ontology associated with a domain;
   extract a set of concepts in the document, the set of concepts represented in the ontology;
   cause presenting of an ontology graph comprising the set of concepts and connected concepts, which are connected to the set of concepts according to the ontology associated with the domain, and allowing a user to select a subgraph from the ontology graph, wherein the subgraph includes a hierarchy level in the ontology graph;

receive a set of selected concepts selected from the ontology, the set of selected concepts represented by the subgraph; and perform a search based on the set of selected concepts.

9. The system of claim 1, wherein the at least one hardware processor is further operable to return a document resulting from the search mapped to the ontology.

10. The system of claim 8, wherein the at least one hardware processor is further operable to return a document resulting from the search.

11. The system of claim 8, wherein the set of selected concepts is a sub-graph of the ontology selected by a user.

12. The system of claim 8, wherein a sub-graph is automatically identified based on the extracted set of concepts.

13. The system of claim 8, wherein the extracted set of concepts and a graph representing the ontology are returned for presentation on a graphical user interface.

14. The system of claim 8, wherein the domain is received.

15. A computer program product comprising a computer readable storage medium having program instructions embodied therewith, the program instructions executable by a device to cause the device to:

receive, by the device, a document;

retrieve, by the device, an ontology associated with a domain;

extract, by the device, a set of concepts in the document, the set of concepts represented in the ontology;

cause presenting of an ontology graph comprising the set of concepts and connected concepts, which are connected to the set of concepts according to the ontology associated with the domain, and allowing a user to select a subgraph from the ontology graph, wherein the subgraph includes a hierarchy level in the ontology graph;

receive, by the device, a set of selected concepts selected from the ontology, the set of selected concepts represented by the subgraph; and perform, by the device, a search based on the set of selected concepts selected from the ontology.

16. The computer program product of claim 15, wherein the device is further caused to return a document resulting from the search mapped to the ontology.

17. The computer program product of claim 15, wherein set of selected concepts is a sub-graph of the ontology selected by a user.

18. The computer program product of claim 15, wherein a sub-graph is automatically identified based on the extracted set of concepts.

19. The computer program product of claim 15, wherein the set of extracted concepts and a graph representing the ontology are returned for presentation on a graphical user interface.

20. The computer program product of claim 15, wherein the domain is received.

* * * * *